United States Patent [19]

Mizoguchi et al.

[11] Patent Number: 6,039,997
[45] Date of Patent: Mar. 21, 2000

[54] BREAD AND BREAD'S DOUGH

[75] Inventors: Naoyuki Mizoguchi, Nagoya; Katsuyuki Yamamoto, Itami; Kimihito Wada, Nishinomiya, all of Japan

[73] Assignee: Matsutani Chemical Industries Co., Ltd., Hyogo-ken, Japan

[21] Appl. No.: 08/835,481

[22] Filed: Apr. 8, 1997

[30] Foreign Application Priority Data

Apr. 9, 1996 [JP] Japan .................................. 8-112024

[51] Int. Cl.$^7$ .................................................. A21D 10/00
[52] U.S. Cl. .......................... 426/549; 426/94; 426/496; 426/578
[58] Field of Search ................................... 426/549, 578, 426/496, 94

[56] References Cited

U.S. PATENT DOCUMENTS

| | | |
|---|---|---|
| 4,873,098 | 10/1989 | Banks et al. . |
| 4,885,180 | 12/1989 | Cochran et al. ........................ 426/549 |
| 4,973,447 | 11/1990 | Seib et al. .............................. 426/549 |
| 5,093,146 | 3/1992 | Calandro et al. . |
| 5,362,510 | 11/1994 | Mizoguchi et al. .................... 426/549 |
| 5,595,773 | 1/1997 | Wada et al. ............................. 426/270 |

FOREIGN PATENT DOCUMENTS

| | | |
|---|---|---|
| 0 522 942 | 1/1993 | European Pat. Off. . |
| 0 700 636 | 3/1996 | European Pat. Off. . |
| 0700636 | 3/1996 | European Pat. Off. . |
| 59-175845 | 10/1984 | Japan . |
| 3-87135 | 4/1991 | Japan . |
| 4-91744 | 3/1992 | Japan . |
| 5-15296 | 1/1993 | Japan . |
| WO 96 09769 | 4/1996 | WIPO . |

*Primary Examiner*—Lien Tran
*Attorney, Agent, or Firm*—Sughrue, Mion, Zinn, MacPeak & Seas, PLLC

[57] ABSTRACT

A dough for a bread which is obtainable by adding 65 to 90 parts by weight of water per 100 parts by weight of a raw powder, and kneading the mixture, wherein the raw powder comprises 50 to 90 parts by weight of wheat flour and 50 to 10 parts by weight of starches including at least 4 parts by weight of a cold water swelling starch and comprises 6.5 to 9.0% by weight of protein derived from wheat flour, and a bread made of the dough. The starches may include a cross-linked starch of which hot water swelling power is 3 to 15 and hot water solubility is 15% or less by weight in addition to the cold water swelling starch. Thus obtained bread has natural taste of bread along with moderate springiness, moist texture, easily resolving property in the mouth, short and light texture.

4 Claims, No Drawings

BREAD AND BREAD'S DOUGH

FIELD OF THE INVENTION

The present invention relates to a dough for a bread, especially to a dough for a bread having a novel taste and texture, and to the bread made of the dough.

BACKGROUND OF THE INVENTION

Recently consumer's needs have become variety and a tendency to require an entirely new type of food or a food having a new taste and texture is seen. There is also a great need for a bread having a new taste and texture.

Bread is one of the essential food for every day consumption and various kinds of bread are known. For example, bread includes one which is made of lean blending (recipe) and has a tough and a chewy texture (that is, the texture is tough and one should eat such bread by chewing well) (e.g. a loaf of bread), a bread made of rich blending (recipe) having no springiness and short but dry texture (e.g. panettone and brioche) and the like. Thus, most of conventional breads are classified into two types of breads, one with no springiness but with short and dry texture, and the other with a tough and a chewy texture as well as hard resolving (property) in the mouth.

There has not been a bread which has a moderate springiness (that is, sponge-like springiness) along with short texture, easy resolving property in the mouth (which means the bread resolves easily in the mouth), and moist texture. Such taste and texture can not be obtained even by utilizing a mixture of a lean blending and a rich blending.

Generally, an emulsifier or emulsified oil or fat is used for making bakery food short texture. However, addition of sufficient amount of such agent to obtain such effect would provide bakery food with a bad taste and oily and heavy texture.

The inventors of the present invention have proposed a method for providing bread with a soft texture by utilizing a specific processed starch (JP-A-3-87135, JP-A-4-91744, JP-A-5-15296). Another method characterized in addition of pregelatinized starch is also disclosed in JP-A-59-175845. These methods make bread soft, but a dough obtained in these methods are softened and this makes it difficult to process the dough. When decreasing the amount of water in order to solve the problem of softening of dough, this in turn makes it difficult to obtain a bread having a soft texture along with light and short texture.

SUMMARY OF THE INVENTION

An object of the present invention is to provide a bread having a natural taste of bread along with a moderate springiness, moist texture, easy resolving property in the mouth, short and light texture, and a dough for the bread.

Generally bread is made through steps of fermenting a dough comprising wheat flour, yeast, salts, and water as a main component and optionally sugars, dairy products, egg, oils and fats and the like to expand and baking the expanded dough. Thus obtained bread has a delicious smell and taste (owing to yeast fermentation) along with a tough, a chewy and non-short texture. When utilizing a very rich blending recipe, the texture of bread become short but unspringy and dry.

The inventors of the present invention have been studied and obtained a bread with a novel taste and texture, that is, a bread which has a moderate springiness (that is, sponge-like springiness), moist texture, easy resolving property in the mouth, short and light texture along with a natural taste of bread (e.g. delicious smell and taste).

The present invention is achieved by producing a bread from a dough by adding 65 to 90 parts by weight of water per 100 parts by weight of said raw powder and kneading the mixture, said raw powder comprising 50 to 90 parts by weight of wheat flour and 50 to 10 parts by weight of starches including at least 4 parts by weight of a cold water swelling starch and comprising 6.5 to 9.0 % by weight of protein derived from wheat flour.

DESCRIPTION OF THE PREFERRED EMBODIMENTS

The term "bread" as used herein refers to a product made by baking a dough which is fermented and expanded after blending wheat flour, yeast, salts, water and yeast food and additional materials conventionally utilized in the production of breads or additional materials specific to the kind of bread to be produced in an appropriate blending rate. Examples of additional materials include saccharides such as sugar, glucose, isomerized saccharides, oligosaccharides and the like, dairy products such as skim milk powder, whole milk powder and the like, oils and fats such as shortening, margarine butter and the like, emulsifiers such as glycerin fatty acid esters, sucrose fatty acid esters and the like, seasonings such as cinnamon, basil and the like, liquors such as brandy, rum and the like, dried fruits such as raisin, dry cherry and the like, nuts such as almond, peanuts and the like, starch decomposition enzymes such as α-amylase, β-amylase, glucoamylase and the like, flavors such as vanilla essence and the like, artificial sweetners such as aspartame and the like, fibers such as indigestible dextrin and the like, vital gluten, cocoa powder and the like. Examples of bread include white bread such as pullman, English bread and the like, French bread such as buguette, parisian and the like, rolls such as buns, table rolls and the like, variety kinds of sweet rolls and the like.

The dough of the present invention also can be applied to a frozen baker's dough which is recently utilized for the purpose of rationalization of production of bread or supplying fresh bread.

The wheat flour used in the present invention may be any wheat flour such as soft wheat flour, super hard wheat flour (comprising more than 14% by weight of protein) and the like provided that the amount of protein come from the wheat flour used in a raw powder ranges from 6.5 to 9.0% by weight per 100% by weight of the raw powder. In addition, a part of wheat flour can be replaced with other flours such as rye flour, corn flour, graham flour and rice flour. The amount of replaced other flour is 50% by weight or less, and preferably from 10 to 30% by weight. Even when such other flour is utilized, the amount of protein in the raw powder is required to be in a given range described above. Also a part of wheat flour may be replaced with vital gluten so that the amount of protein is in a given range.

The term "raw powder" as used herein refers to a raw material which comprises starches and wheat flour.

According to the present invention, 50 to 90 parts by weight of wheat flour and 50 to 10 parts by weight of starches are utilized as a raw powder, and preferably 60 to 85 parts by weight of wheat flour and 40 to 15 parts by weight of starches. When the amount of starches is more than 50 parts by weight, moderate springiness and moist texture of bread tend to lose. When the amount of starches is less than 10 parts by weight, the effect of the present invention is decreased.

Starches include at least 4 parts by weight of cold water swelling starch and preferably from 5 to 12 parts by weight. Starches other than cold water swelling starch may be selected from a group consisting of native starches and processed starches excepting cold water swelling starch. Among these starches, a crosslinked starch having hot water swelling power ranging from 3 to 15 and hot water solubility of 15% by weight or less is preferable.

When the amount of cold water swelling starch is less than 4 parts by weight, the effect of the present invention is decreased. When the amount of cold water swelling starch is more than 15 parts by weight, short texture and easy resolving property in the mouth of bread tend to lose.

The term "cold water swelling starch" refers to a processed starch characterized in having a hot water solubility of not more than 8% by weight, a ratio of a cold water swelling power (Sc) to a hot water swelling power (Sh), Sc/Sh, ranging from 1.2 to 0.8 and a cold water swelling power ranging from 4 to 15.

Such processed starch can be prepared according to, for example, the method disclosed in Japan Kokai No. Hei 5-15296 (U.S. Pat. No. 5,362,510). More specifically, the processed starch can be prepared by crosslinking commercially available starch, preferably at least one or more member selected from a group consisting of potato starch, sweet potato starch and sago starch to give a crosslinked starch for cold water swelling starch.

The crosslinked starch for cold water swelling starch may be one prepared by only crosslinking in the presence of conventional crosslinking agent such as trimetaphosphate, phosphorus oxychloride and epichlorohydrin, but preferred are crosslinked starch ethers or esters prepared by etherification or esterificaion and crosslinking reaction. The degree of crosslinking of the starch is such that the concentration of the starch solution having about 500 mpa.s of viscosity at 50° C. ranges from 10 to 17% by weight, when the starch is heated up to 90° C., then cooled down to 50° C. Viscosity is determined via Brookfield-type viscometer. The esterification or etherification are carried out in such manner that the degree of substitution (DS) ranges from 0.01 to 0.25. The esterification or etherification can be performed according to a conventional method and wide variety of reagents for esterification or etherification can be used in these reaction.

Thus obtained crosslinked starch for cold water swelling starch can be converted into cold water swelling starch by preparing an aqueous slurry comprising about 10 to 40% by weight of the crosslinked starch followed by heating the aqueous slurry at a temperature between at least about 27° C. higher than the swelling-starting temperature as determined at a slurry concentration of 20% by weight using Brabender amylograph and not more than 130° C. Further, it is preferable to dry the cold water swelling starch by spray drying or drum drying to obtain a powder formulation since shelf stability, handling properties and the like are advantageous.

Cold water swelling power, hot water swelling power and hot water solubility with respect to the cold water swelling starch of the present invention can be determined by the methods described below. The methods for determining hot water swelling power and hot water solubility also can be applied to the crosslinked starch.

<Cold Water Swelling Power>

About 1 g (dry basis) of sample is dispersed in 100 ml of water at 25° C. and stirred gently for 30 min. in a thermostatic chamber maintained at 25° C. Then the dispersion is centrifuged at 3,000 r.p.m for 10 min. to separate gel phase from supernatant. The weight of the gel phase is determined, which is regarded as A. Thus weighed gel phase is dried (at 105 ° C. till a constant weight is obtained) and weighed again, which is regarded as B. Cold water swelling power is herein defined as A/B.

<Hot Water Solubility, Hot Water Swelling Power>

One gram (dry basis) of sample is dispersed in 100 ml of water. Immediately after heat-treatment at 90° C. for 30 min., centrifugation of the dispersion (3,000 r.p.m. for 10 min.) is performed to separate gel phase from supernatant. The weight of gel phase is determined, which is regarded as C. Thus weighed gel phase is dried (at 105° C. till a constant weight is obtained) and weighed again, which is regarded as D. Hot water swelling power is herein defined as C/D. Further, the volume of the supernatant obtained at this stage is determined and all of the saccharides present in the supernatant is quantitatively analyzed by the phenol-sulfuric acid method to thus evaluate the hot water solubility.

According to the present invention, raw powder comprises 50 to 90 parts by weight, preferably 60 to 85 parts by weight of wheat flour and 50 to 10 parts by weight, preferably 40 to 15 parts by weight of starches. Starches include at least 4 parts by weight, preferably 5 to 12 parts by weight of cold water swelling starch and/or at least one or more starch which is selected from a group consisting of native starch and processed starch.

Native starch means a commercially available unprocessed starch including wheat starch, tapioca starch, potato starch, rice starch, waxy corn starch, corn starch and the like. Processed starch refers to any starch (but excepting the cold water swelling starch) which is obtained by processing the native starch in an appropriate manner. Such processed starch includes bleached starch, soluble starch, crosslinked starch, heat-treated starch, fat-treated starch, etherified starch, esterified starch and the like. Among the above, preferred starch is a crosslinked starch having 3 to 15 of hot water swelling power and 15% by weight or less of hot water solubility since the desired effects of the present invention is obtained by use of the starch.

The crosslinked starch can be obtained by crosslinking starches in the presence of a conventional crosslinking agent such as trimetaphosphate, phosphorus oxychloride and epichlorohydrin. The degree of crosslinking of the starch is such that the starch has 3 to 15 of hot water swelling power and 15% by weight or less of hot water solubility. When hot water swelling power and hot water solubility are out of the above described range, the advantages of the present invention can not be seen.

Starting material for production of crosslinked starch includes any commercially available starch such as potato starch, tapioca starch, sago starch, corn starch, waxy corn starch, wheat starch, rice starch, sweet potato starch and the like. However, it is necessary to adjust the degree of crosslinking depending on the kind of starch so that the hot water swelling power and hot water solubility fall within the above described range since the degree of crosslinking does not always connect with hot water swelling power and hot water solubility depending on the kind of starch.

The crosslinked starch of the present invention consequently has hot water swelling power ranging 3 to 15 and 15% by weight or less of hot water solubility. Therefore, crosslinked starches obtained through other processing steps such as bleaching, etherification, esterification and the like are also included in the present invention provided that these starches have the above characteristics.

According to the present invention, raw powder of the present invention comprises 50 to 90 parts by weight, preferably 60 to 85 parts by weight of wheat flour and 50 to 10 parts by weight, preferably 40 to 15 parts by weight of starches and the raw powder essentially comprises 6.5 to 9.0% by weight of protein originated from wheat flour. Wheat flour can be selected so that the amount of protein falls within the range, or the amount of protein can be controlled by addition of vital gluten extracted from wheat flour. Thus, when the amount of starch is relatively low, wheat flour may be selected from one having relatively low amount of protein. When starch is utilized in a relatively high amount or other flour such as rice flour and rye flour is utilized as a replacement of a part of wheat flour, wheat flour may be selected from one having relatively high amount of protein or vital gluten is added in order to adjust the amount of protein in the given range. When the amount of protein is out of the range, the effect of the present invention can not be obtained.

Further, the amount of water to be added in the preparation of a bread's dough is 65 to 90 parts by weight per 100 parts by weight of raw powder. This amount of water is not suitable for usual bread's production procedure which utilizes only wheat flour as a raw powder. Because this amount of water makes the dough soft and sticky and, hence, formulation of such dough becomes difficult. However, there is no problem when applying this amount of water to the dough of the present invention and the effect of the present invention is obtained. It should be noted that the amount of water as used herein includes the amount of water from eggs.

The present invention can be applied to any procedure for preparing bread commonly employed in this field such as "the sponge dough method" and "the straight dough method". In any procedure, bread of the present invention can be obtained by blending essential materials such as salt, yeast, yeast food, sugar, fats and oils, and the like with the raw powder, followed by adding 65 to 90 parts by weight of water per 100 parts by weight of the raw powder, kneading the mixture, fermenting the dough to expand and baking the expanded dough. The wheat flour and starches, or other materials can be mixed in advance to make a premix or each material may also be added during the procedure.

Thus obtained bread according to the present invention has a novel taste and texture, that is, a natural taste of bread (e.g. delicious smell and taste) along with a moderate springiness (sponge-like springiness), moist texture, easy resolving property in the mouth, short and light texture. Moderate springiness as used herein refers to a sponge-like springiness in contrast to a tough texture like French bread.

The present invention will hereinafter be described in more detail with reference to the following Reference Examples and working Examples, provided that "part" and "%" represent "part by weight" and "% by weight".

EXAMPLES

Reference Example 1

Twenty parts of sodium sulfate was dissolved in 120 parts of water and 100 parts of potato starch was added to the solution to give a slurry, followed by addition of 30 parts of 4% aqueous caustic soda solution, 4 parts of propylene oxide, 0.1 parts (sample No. 1), 0.14 parts (sample No. 2), 0.4 parts (sample No. 3), 0.8 parts (sample No. 4) of epichlorohydrin with stirring. After the reaction was continued for 21 hours at 41° C., the reaction mixture was neutrized with sulfuric acid and washed with water. The concentrations of these samples whose viscosity was about 500 mPa.s at 50° C. were found to be about 8.5%, 10%, 15% and 16.5% respectively and the swelling-starting temperature thereof was found to be about 53° C. Then each sample was converted into a 25% aqueous slurry and the slurry was dried by heat-treating in a double drum-dryer whose surface temperature was controlled to 150° C. At this stage, the temperature of the heat-treatment was found to be 102° C. Then each resulting dried product was pulverized to give cold water swelling starch of Sample No. 1 to Sample No. 4. Physical properties of these processed starches are shown in Table 1. The degrees of etherification (DS) were within the range of from 0.08 to 0.85. In Table 1, "swelling power ratio" means the ratio of the cold water swelling power to the hot water swelling power.

Reference Example 2

The same procedure (till the water-washing process through the reaction) used in the preparation of Sample No. 3 of Reference Example 1 was repeated and the reaction mixture was heat-treated under the following conditions to give Sample No. 5. After water-washing, a 15% of aqueous slurry was heated for 64° C. for 15 min. and then spray drying it at an inlet temperature of 175° C. and an outlet temperature of 85° C. Physical property of the processed starch is shown in Table 1.

TABLE 1

| Sample No. | Hot water solubility (%) | Cold water swelling power | Swelling power ratio |
| --- | --- | --- | --- |
| 1 | 9.0 | 16.4 | 1.23 |
| 2 | 7.1 | 14.1 | 1.12 |
| 3 | 2.5 | 8.5 | 1.02 |
| 4 | 0.8 | 5.3 | 0.84 |
| 5 | 2.4 | 5.8 | 0.70 |

Reference Example 3

Ten parts of sodium sulfate was dissolved in 120 parts of water and 100 parts of tapioca starch was added to the solution to give four slurries, followed by addition of 3% aqueous caustic soda solution to maintain the pH of the solution from 11.1 to 11.3, 1 parts (Sample No. 6), 0.2 parts (Sample No. 7), 0.1 parts (Sample No. 8), and 0.03 parts (Sample No. 9) of sodium trimetaphosphorate with stirring. After the reaction was continued for 10 hours at 39° C., the reaction mixture was neutrized with hydrochloric acid, washed with water, removed water and dried to give crosslinked starches of Sample No. 6 to Sample No. 9. Physical properties of these processed starches are shown in Table 2.

Reference Example 4

Twenty parts of sodium sulfate was dissolved in 120 parts of water and 100 parts of commercially available potato starch was added to the solution to give a slurry, followed by addition of 30 parts of 4% aqueous caustic soda solution, 6 parts of propylene oxide, and 0.12 parts of sodium trimetaphosphorate with stirring. After the reaction was continued for 18 hours at 42° C., the reaction mixture was neutrized with sulfuric acid, washed with water, removed water and dried to give a starch of Sample No. 10. Physical property of the processed starch is shown in Table 2.

TABLE 2

| Sample No. | Hot water swelling power | Hot water solubility (%) |
| --- | --- | --- |
| 6 | 4.2 | 0.4 |
| 7 | 8.8 | 4.2 |
| 8 | 12.2 | 9.3 |
| 9 | 18.8 | 16.6 |
| 10 | 17.7 | 9.7 |

Example 1

Bread were produced from the dough having the following formulations (rate of blending of each ingredient is expressed in terms of parts) utilizing cold water swelling starches of Sample No. 1 to Sample No. 5 in Table 1 and crosslinked starch of Sample No. 7. The amount of protein derived from wheat flour in the raw material consisting of wheat flour and starches was 8.1%. The amount of water including the water from egg york was 77 parts. As the formulation of Control the same formulation as in the Example was used excepting that 100 parts of wheat flour having 11.6% of protein was utilized and 50 parts of water was utilized.

<Blending Rate>

| | |
| --- | --- |
| wheat flour (the amount of protein is 11.6%) | 70 |
| cold water swelling starch (Sample No. 1–5) | 10 |
| crosslinked starch (Sample No. 7) | 20 |
| yeast food | 0.12 |
| sugar | 22 |
| salt | 1 |
| skim milk powder | 3 |
| egg york | 18 |
| margarin | 18 |
| yeast | 3.5 |
| water | 68 |

First, these ingredients excepting water, egg york, and margarin were combined and mixed together in advance, then the egg york and water were added and kneaded, followed by adding margarin, kneading the mixture at a kneading temperature of 26 to 27° C., fermenting for 70 min., punching, further fermenting for 30 min., dividing into pieces each having a weight of 240 g, benching for a bench time of 5 min., passing the pieces through a molder to shape into loaves, proofing at 38° C. for 50 min., and baking them at 170° C. for 15 min. using a gas-convection oven. The taste and texture of thus produced bread was evaluated according to the following evaluation criteria. The results are shown in Table 3 along with samples used.

<Springiness>

⊚: good (sponge-like) springiness ◯: rather good springiness

Δ: almost no springiness

X: no springiness

<Moistness>

⊚: moist ◯: rather moist

Δ: rather dry X: dry

<Shortness and Lightness>

⊚: short and light ◯: rather short and light

Δ: rather chewy and rather non-short X: chewy and non-short

<Resolving Property in the Mouth>

⊚: resolves easily in the mouth ◯: resolves rather easily in the mouth Δ: resolves after a while in the mouth X: resolves after a long time in the mouth <Taste>

⊚: good ◯: rather good Δ: rather unsatisfactory X: bad

TABLE 3

| | cold water swelling starch | springiness | moistness | shortness [1] | resolving property | taste |
| --- | --- | --- | --- | --- | --- | --- |
| Control | — | X | ⊚ | X | X | ⊚ |
| Comp. Ex. | Sample No. 1 | Δ | ◯ | Δ | Δ | ⊚ |
| Example | Sample No. 2 | ⊚ | ⊚ | ⊚ | ⊚ | ⊚ |
| Example | Sample No. 3 | ⊚ | ⊚ | ⊚ | ⊚ | ⊚ |
| Example | Sample No. 4 | ⊚ | ⊚ | ⊚ | ⊚ | ⊚ |
| Comp. Ex. | Sample No. 5 | Δ | Δ | Δ | ◯ | ⊚ |

[1] shortness and lightness

Example 2

The same procedure used in Example 1 was repeated excepting that cold water swelling starch of Sample No. 3, crosslinked starches of Sample No. 6 to Sample No. 10 and commercially available wheat starch were used as starches. The results of evaluation of thus produced breads are shown in Table 4.

TABLE 4

| | crosslinked starch | springiness | moistness | shortness[1] | resolving property | taste |
| --- | --- | --- | --- | --- | --- | --- |
| Example | Sample No. 6 | ⊚ | ⊚ | ⊚ | ⊚ | ⊚ |
| Example | Sample No. 7 | ⊚ | ⊚ | ⊚ | ⊚ | ⊚ |
| Example | Sample No. 8 | ⊚ | ⊚ | ⊚ | ⊚ | ⊚ |
| Example | Sample No. 9 | ⊚ | ⊚ | ◯ | ◯ | ⊚ |
| Example | Sample No. 10 | ⊚ | ⊚ | ◯ | ◯ | ⊚ |
| Example | wheat starch | ⊚ | ⊚ | ◯ | ◯ | ⊚ |

[1] shortness and lightness

Example 3

Breads were prepared by repeating the same procedure used in Example 1 excepting that cold water swelling starch of Sample No. 3 and crosslinked starch of Sample No. 7 were used as starches, super hard wheat flour (the amount of protein is 14.5%) and soft wheat flour (the amount of protein is 8.0%) were used as wheat flour and the rate of blending of these ingredients and water (including 9 parts of water from egg york) were as indicated in Table 5 (expressed in "parts"). Further, the amount of protein in the raw powder were adjusted to 7.5 to 8.0% by partially utilizing vital gluten (the amount of protein is 76.5%, the same vital gluten was used in the other Examples described hereinafter).

Raw powder Sample Nos. 1, 2, 3, 5, 6 and 7 are indicated for the purpose of comparing the rate of wheat flour and starches, and Sample Nos. 3, 4, 5, 6 and 7 are for comparing the amount of cold water swelling starch. The results of evaluation of thus obtained breads are shown in Table 6.

TABLE 5

| raw powder No. | s.h.w. flour[1] | soft flour | vital gluten | c.w.s. starch[2] | crosslinked starch | amount of water |
| --- | --- | --- | --- | --- | --- | --- |
| 1 | 40 | — | 2.5 | 11 | 46.5 | 78 |
| 2 | 50 | 5 | — | 11 | 34 | 78 |
| 3 | 40 | 25 | — | 11 | 24 | 78 |
| 4 | 40 | 25 | — | 14 | 21 | 85 |
| 5 | 20 | 60 | — | 6 | 14 | 67 |

TABLE 5-continued

| raw powder No. | s.h.w. flour[1] | soft flour | vital gluten | c.w.s. starch[2] | crosslinked starch | amount of water |
|---|---|---|---|---|---|---|
| 6 | 13 | 75 | — | 5 | 7 | 65 |
| 7 | 5 | 89 | — | 3 | 3 | 52 |

[1] super hard wheat flour,
[2] cold water swelling starch

TABLE 6

| | raw powder | springiness | moistness | shortness[1] | resolving property | taste |
|---|---|---|---|---|---|---|
| Comp. Ex. | Sample No. 1 | Δ | X | ○ | ○ | Δ |
| Example | Sample No. 2 | ○ | ○ | ○ | ○ | ○ |
| Example | Sample No. 3 | ⊙ | ⊙ | ⊙ | ⊙ | ⊙ |
| Example | Sample No. 4 | ○ | ⊙ | ○ | ○ | ⊙ |
| Example | Sample No. 5 | ⊙ | ⊙ | ⊙ | ⊙ | ⊙ |
| Example | Sample No. 6 | ○ | ○ | ○ | ○ | ⊙ |
| Comp. Ex. | Sample No. 7 | Δ | Δ | Δ | Δ | ⊙ |

[1] shortness and lightness

Example 4

Breads were produced by repeating the same procedure in Example 3 excepting that raw powders in Table 7 (expressed in parts) were used and 75 parts of water including water from egg york was used. The results of evaluation of the bread was shown in Table 8.

TABLE 7

| raw powder No. | s.h.w. flour[1] | soft flour | vital gluten | c.w.s. starch[2] | crosslinked starch | amount of protein (%) |
|---|---|---|---|---|---|---|
| 8 | 11 | 55 | — | 13 | 21 | 6.0 |
| 9 | 5 | 59 | 2 | 11 | 23 | 7.0 |
| 10 | 50 | 16 | — | 9 | 25 | 8.4 |
| 11 | 66 | — | — | 8 | 26 | 9.6 |

[1] super hard wheat flour,
[2] cold water swelling starch

TABLE 8

| | raw powder | springiness | moistness | shortness[1] | resolving property | taste |
|---|---|---|---|---|---|---|
| Comp. Ex. | Sample No. 8 | Δ | X | ○ | Δ | Δ |
| Example | Sample No. 9 | ○ | ⊙ | ⊙ | ⊙ | ⊙ |
| Example | Sample No. 10 | ⊙ | ⊙ | ⊙ | ○ | ⊙ |
| Comp. Ex. | Sample No. 11 | ○ | Δ | X | Δ | ⊙ |

[1] shortness and lightness

Example 5

The same procedure in Example 3 was repeated excepting that the raw powder (comprising 7.9% of protein derived from wheat flour) was used in the rate as indicated in Table 9 (expressed in parts) and water (including 9 parts of water from egg york) was used in the amount as indicated in Table 10 to produce bread. The results of evaluation of the bread was shown in Table 10.

TABLE 9

| raw powder No. | s.h.w. flour[1] | soft flour | c.w.s. starch[2] | crosslinked starch | amount of water |
|---|---|---|---|---|---|
| 12 | 35 | 35 | 4 | 26 | 60 |
| 13 | 35 | 35 | 7 | 23 | 70 |
| 14 | 35 | 35 | 13 | 17 | 85 |
| 15 | 35 | 35 | 16 | 14 | 95 |

[1] super hard wheat flour,
[2] cold water swelling starch

TABLE 10

| | raw powder | springiness | moistness | shortness[1] | resolving property | Taste |
|---|---|---|---|---|---|---|
| Comp. Ex. | Sample No. 12 | Δ | Δ | Δ | Δ | ⊙ |
| Example | Sample No. 13 | ⊙ | ⊙ | ⊙ | ⊙ | ⊙ |
| Example | Sample No. 14 | ⊙ | ⊙ | ○ | ○ | ⊙ |
| Comp. Ex. | Sample No. 15 | Δ | ○ | Δ | Δ | Δ |

[1] shortness and lightness

Example 6

A bread was produced according to the following blending rate (expressed in parts) and conditions utilizing cold water swelling starch of Sample No. 4 and cross linked starch of Sample No. 8.

Thus obtained bread had natural taste of bread, moderate springiness, moist texture and short and light texture.

<Blending Rate>
<Sponge> wheat flour (amount of protein 11.6%) 45
crosslinked starch (Sample No.7) 25

| yeast food | 0.12 |
|---|---|
| sugar | 5 |
| egg york | 15 |
| yeast | 3.5 |
| water | 27 |
| <dough> | |
| wheat flour (amount of protein 11.6%) | 25 |
| cold water swelling starch (Sample No. 4) | 5 |
| sugar | 15 |
| salt | 1.2 |
| skim milk powder | 3 |
| margarin | 15 |
| water | 35 |

<Condition> sponge mixing temp.: 24° C. sponge fermentation time: 2 hours dough mixing temp.: 28° C.

floor time: 30 min. Dividing: 185 g Benching time: 15 min.

proofing temp.: 37° C. proofing humidity: 80% proofing time: 70 min.

baking temp.: 160° C. baking time: 17 min.

Example 7

A bread was produced utilizing cold water swelling starch of Sample No. 2, crosslinked starch of No.6 and the following blending rate (expressed in parts).

<Blending Rate>

| | |
|---|---|
| super hard wheat flour (amount of protein 14.5%) | 40 |
| soft wheat flour (amount of protein 7.5%) | 28 |
| cold water swelling starch (Sample No. 2) | 9 |
| crosslinked starch (Sample No. 5) | 23 |
| yeast food | 0.1 |
| B.B.J (S. I. Lesaffre Company, dough improving agent) | 0.9 |
| sugar | 23 |
| salt | 1.1 |
| skim milk powder | 2.7 |
| egg york | 18 |
| frozen east | 5.5 |
| water | 60 |
| margarin | 18 |

Bread was prepared by kneading the above dough at a kneading temperature of 22° C., followed by fermenting for 20 min., spreading the dough to thickness of 3 cm, freezing at −40° C. for 1 hour. After keeping it in the frozen state at −20° C. for 10 days, the frozen dough was thawed in the refrigerator (at 5° C.) for 12 hours, divided into pieces, followed by shaping into pinwheel, snail, twist and the like, proofing in a proofer of which humidity is 70% at 32° C. for 60 min., treating with topping and baking.

Thus obtained bread has a natural taste of bread along with moderate springiness, moist texture, easily resolving property in the mouth, and short and light texture.

What is claimed is:

1. A dough for a bread which is obtainable by adding 65 to 90 parts by weight of water per 100 parts by weight of a raw powder, and kneading the mixture, wherein said raw powder comprises 50 to 90 parts by weight of wheat flour and 50 to 10 parts by weight of starches including at least 4 parts by weight of a cold water swelling starch having a hot water solubility of not more than 8% by weight, a ratio of a cold water swelling power (Sc) to a hot water swelling power (Sh), Sc/Sh, ranging from 1.2 to 0.8 and a cold water swelling power ranging from 4 to 15; said raw powder additionally comprises a cross-linked starch that is different from the cold water swelling starch, said cross-linked starch having a hot water swelling power ranging from 3 to 15 and a hot water solubility of 15% or less by weight and comprises 6.5 to 9.0% by weight of protein derived from wheat flour.

2. A dough for a bread according to claim 1, wherein the raw powder comprises 60 to 85 parts by weight of wheat flour and 40 to 15 parts by weight of starches including 5 to 12 parts by weight of the cold water swelling starch.

3. A bread which is obtainable by fermenting and baking a dough which is obtainable by adding 65 to 90 parts by weight of water per 100 parts by weight of a raw powder, and kneading the mixture, wherein said raw powder comprises 50 to 90 parts by weight of wheat flour and 50 to 10 parts by weight of starches including at least 4 parts by weight of a cold water swelling starch having a hot water solubility of not more than 8% by weight, a ratio of a cold water swelling power (Sc) to a hot water swelling power (Sh), Sc/Sh, ranging from 1.2 to 0.8 and a cold water swelling power ranging from 4 to 15; said raw powder additionally comprises a cross-linked starch that is different from the cold water swelling starch, said cross-linked starch having a hot water swelling power ranging from 3 to 15 and a hot water solubility of 15% or less by weight and comprises 6.5 to 9.0% by weight of protein derived from wheat flour.

4. A bread according to claim 3, wherein the raw powder comprises 60 to 85 parts by weight of wheat flour and 40 to 15 parts by weight of starches including 5 to 12 parts by weight of the cold water swelling starch.

* * * * *